United States Patent [19]

French

[11] 4,448,432
[45] May 15, 1984

[54] SABRE SAW CHUCK

[76] Inventor: Errol J. French, P.O. Box 1314, Chattanooga, Tenn. 37401

[21] Appl. No.: 275,253

[22] Filed: Jun. 19, 1981

[51] Int. Cl.³ .......................... B23B 31/12; B23Q 3/00
[52] U.S. Cl. .......................................... 279/83; 30/392
[58] Field of Search .................... 279/1 A, 83, 84, 85, 279/86; 30/392, 393, 394

[56] References Cited

U.S. PATENT DOCUMENTS

| | | | |
|---|---|---|---|
| 2,292,693 | 8/1942 | Huff | 279/83 |
| 2,735,685 | 2/1956 | Karr | 30/392 |
| 3,528,463 | 9/1970 | Mejia | 30/392 |
| 3,721,142 | 3/1973 | Csaki | 30/392 |
| 3,901,499 | 8/1975 | Sporrer | 279/83 |
| 3,927,893 | 12/1975 | Dillon et al. | 30/392 |
| 4,240,432 | 12/1980 | Mormann et al. | 30/392 |
| 4,281,482 | 8/1981 | Rutter | 279/83 |

FOREIGN PATENT DOCUMENTS 75159  5/1953  Denmark .............................. 279/83

Primary Examiner—E. R. Kazenske
Assistant Examiner—Paul M. Heyrana
Attorney, Agent, or Firm—Pitts, Ruderman & Kesterson

[57] ABSTRACT

A sabre saw chuck for securing the shank of one or more files/rasps to the standard head of a sabre saw such that the reciprocating motion of the saw head is imparted to the file/rasp secured thereon. The chuck includes an adaptor body having a centrally disposed bore which receives the sabre saw head. Means are provided which extend through the adaptor body for securing the adaptor body in position on the sabre saw head. The adaptor body includes at least one groove disposed proximate its perimeter for receiving the shank of a file/rasp. A sleeve is telescoped over the adaptor body and secures the file/rasp shank or shanks in position such that reciprocation of the saw head imparts a like reciprocating motion to the file/rasp carried by the chuck.

3 Claims, 6 Drawing Figures

U.S. Patent  May 15, 1984  Sheet 2 of 2  4,448,432
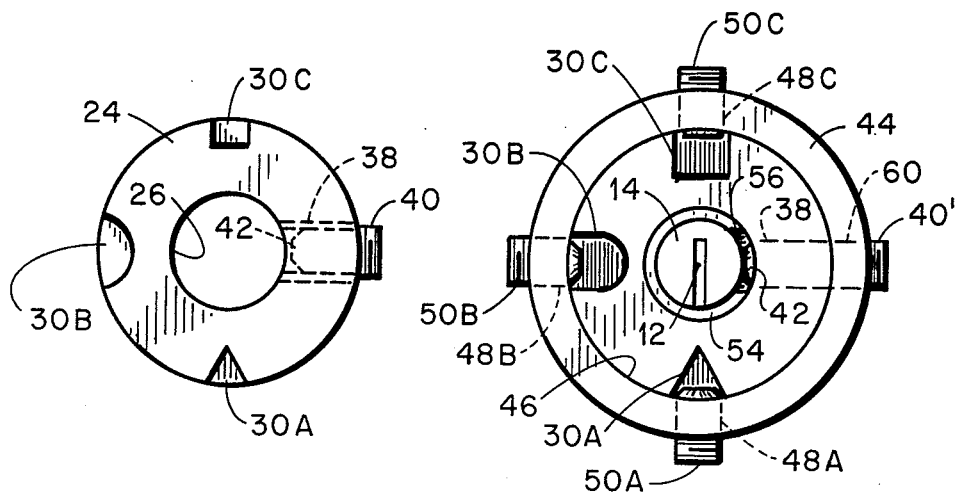
FIG. 2
FIG. 3
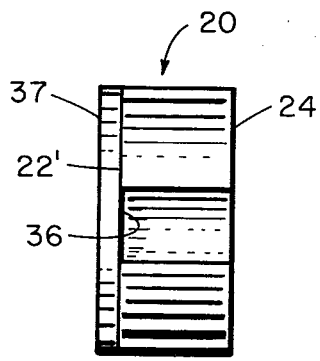
FIG. 4
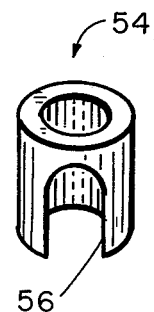
FIG. 5
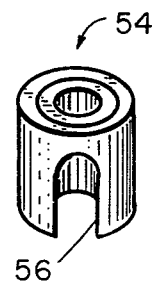
FIG. 6

4,448,432

SABRE SAW CHUCK

DESCRIPTION

1. Technical Field

This invention relates to a sabre saw or reciprocating power saw chuck adapted for securing the shank of one or more files/rasps to the standard head which holds the saw blade in place such that the files/rasps are reciprocated during operation of the saw motor.

2. Background Art

Sabre saws and power reciprocating saws include a head or split-end drive shaft which is secured to a saw blade, as with a collar of conventional design, such that operation of the saw motor causes the saw blade to reciprocate for performing cutting operations. In certain applications it is desirable to impart the reciprocating motion of the saw head to a file or rasp to reduce the time required for performing filing operations. For example, in certain applications it is desirable to alter the geometry of a circular cross-section bore hole and change the bore hole geometry to that of a triangle, square, or the like. This geometric change in the geometry of the bore hole can be accomplished by utilization of a file having a preselected cross-sectional outline. However, if the filling is done manually, the operation is not cost effective and time efficient. Moreover, the labor of a skilled craftsman may be required to assure a preselected cross-sectional outline in the finished hole.

Accordingly, it is an object of the present invention to provide an improved sabre saw chuck for securing the shank of at least one file/rasp to the standard head of a conventional sabre or reciprocating power saw.

Another object of the invention is to provide a sabre saw chuck which can secure a file or rasp having a preselected cross-sectional geometry to the head of a reciprocating sabre or power saw.

A further object of the invention is to provide a sabre saw chuck which can be mounted on the heads of sabre saws having various cross-sectional diameters.

Yet another object of the invention is to provide an improved sabre saw chuck which is inexpensive to manufacture and which can be readily secured to the sabre saw head.

Still another object of the invention is to provide an improved sabre saw chuck which readily attaches the shanks of the files/rasps such that the files/rasps do not rotate and are firmly secured by the chuck.

Other objects and advantages of the invention will become apparent upon reading the detailed description together with the drawings which are described as follows:

BRIEF DESCRIPTION OF THE DRAWINGS

FIG. 2 is a plan view of the adaptor body illustrated in FIG. 1 which includes securing means comprising a set screw used to secure the adaptor body to the head of the sabre saw received within the centrally disposed bore of the adaptor body.

FIG. 3 is a plan view of the adaptor body illustrated in FIGS. 1 and 2 with the sleeve mounted thereon.

FIG. 4 is an elevation view of the adaptor body illustrated in FIG. 2.

FIGS. 5 and 6 illustrate reducing bushings used to vary the effective diameter of the centrally disposed bore in the adaptor body such that the sabre saw chuck can be mounted on sabre saw heads having various diameters.

DISCLOSURE OF THE INVENTION

Figure 1:
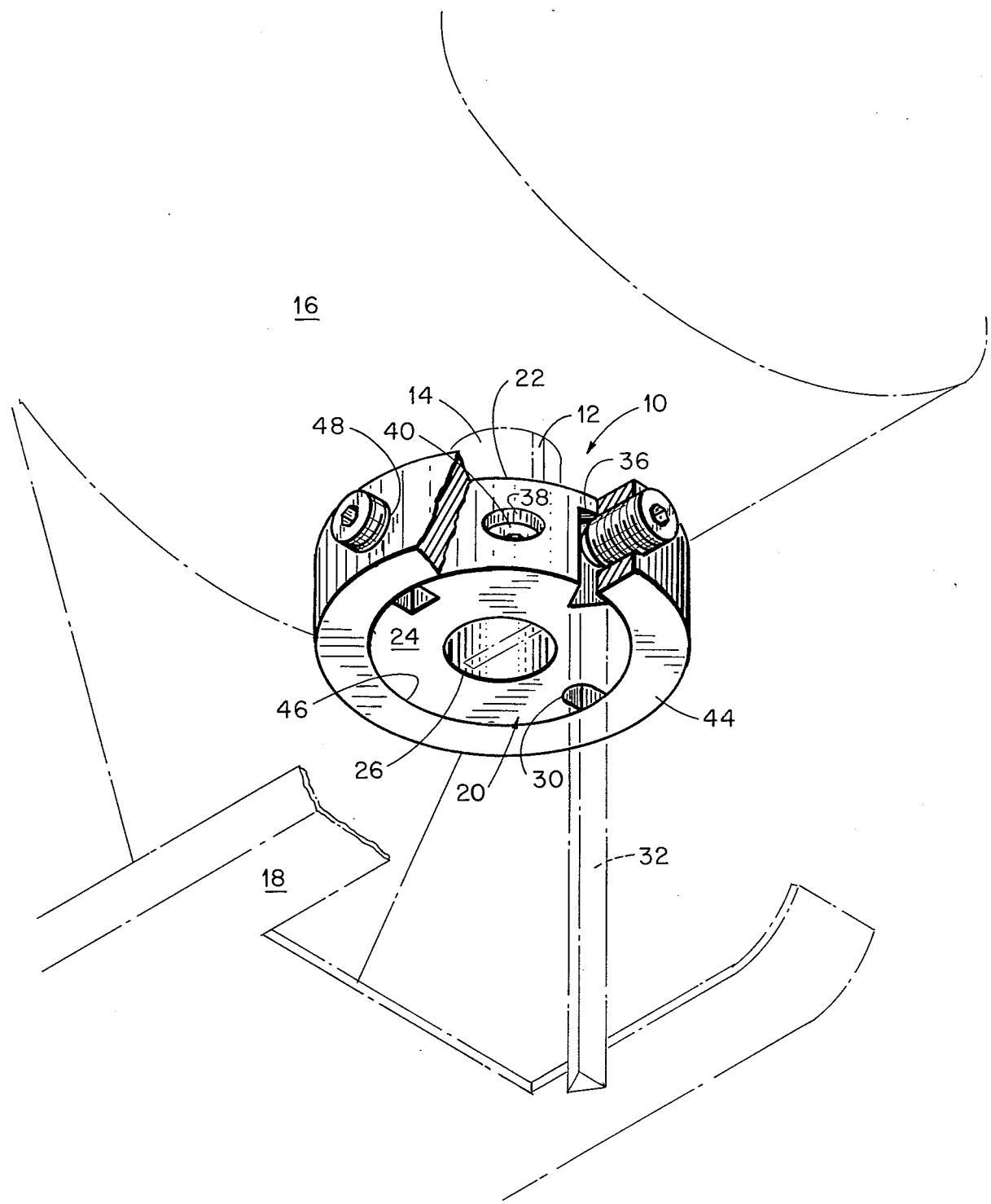
FIG. 1 is a perspective view of a sabre saw chuck constructed in accordance with various features of the present invention.

In accordance with various features of the invention, a sabre saw chuck for securing the shank of one or more files/rasps to the standard head which holds the saw blade in place is provided. The chuck includes an adaptor body having an upper surface and a lower surface and a centrally disposed bore extending therethrough. The bore is proportioned for receiving the head of the saw, and in one embodiment reducing bushings are provided to vary the effective cross-sectional diameter of the centrally disposed bore. The adaptor body has a substantially circular cross-sectional outline with at least one groove disposed along the perimeter of the adaptor body for receiving the shank of a file or rasp. Preferably, the groove opens onto the lower surface of the body and terminates in a shoulder spaced from the upper surface of the body. This shoulder serves as a stop for the end portion of the file/rasp shank during reciprocating operations. A sleeve member having a centrally disposed opening proportioned for receiving the adaptor body is telescoped over the adaptor body and includes bores extending substantially perpendicularly with respect to the axis of the centrally disposed opening. These bores are designed for being juxtaposed with respect to the grooves disposed along the perimeter of the adaptor body and receives securing means such as a set screw which serve to join the sleeve, adaptor body and shank of a file/rasp received in the perimeter groove of grooves of the adaptor body.

BEST MODE FOR CARRYING OUT THE INVENTION

Referring now to the drawings, a sabre saw chuck constructed in accordance with various features of the invention is illustrated generally at 10 in FIG. 1. The illustrated chuck is designed for replacing the conventional collar which secures the blade within the slot 12 of the standard head 14 of the sabre saw or reciprocating power saw 16. Normally, the saw blade secured within the slot 12 will extend down and through the opening provided in the guide 18 of the conventional sabre saw.

The chuck illustrated in FIG. 1 includes an adaptor body 20 having an upper surface 22 and a lower surface 24. A centrally disposed bore 26 opens on the upper surface and the lower surface of the adaptor body and is proportioned for receiving the head 14 of the sabre saw therein. As illustrated in the figures, the cross-sectional outline of the adaptor body is substantially circular. At least one groove 30 is disposed along the perimeter of the adaptor body and serves to receive the shank of a file or rasp illustrated diagramatically at 32 in FIG. 1. As illustrated in the figures, the grooves 30 open on the lower surface of the adaptor body and terminate at their upper end portion in a shoulder 36 which is spaced from the upper surface 22. This shoulder 36 serves as a stop for the end portion of the shank and prevents the shank of the file/rasp from sliding upward in response to the vertical forces exerted along the length of the file/rasp during the reciprocating motion of the saw head.

In an alternate embodiment, the adaptor body is fabricated from two separate members as illustrated in FIG. 4. In this alternate embodiment, the body member defines a groove which opens on both the lower surface 24 and the upper surface 22'. A stop plate 37 is secured to the upper surface 22' of the alternate embodiment, as by brazing or other suitable means and has a centrally disposed bore which aligns with the centrally disposed bore of the body. This stop plate 37 covers the upper end portion of the groove(s) in the adaptor thereby forming the shoulder that prevents upward longitudinal movement of the file/rasp within the grooves.

As illustrated in FIG. 2, a plurality of grooves 30A, 30B and 30C are annularly spaced about the perimeter of the adaptor body. These grooves serve to receive the shank portion of a file/rasp and assume preselected cross-sectional outlines which conform with the cross-sectional outline of the shank of the file/rasp such that the file/rasp does not rotate within the groove after the file/rasp is secured. It of course will be recognized that geometries other than the rectangular, circular or triangular shapes illustrated in the figures can be utilized and as necessary or desired.

A bore 38 extends substantially perpendicularly with respect to the axis of the centrally disposed bore 26 of the adaptor body. This bore 36 includes one end portion which opens onto the external surface of the adaptor body and a further end portion which opens onto the internal surface of the adaptor body and into the opening of the bore 26. This bore 38 is proportioned for receiving securing means generally indicated at 40 which preferably is threadably advanced into internal threads of the bore 38 such that the end portion 42 of the securing means 40 engages the head 14 of the saw to join the adaptor body and the saw head.

As illustrated in FIG. 1, the securing means 40 which is a set screw in the illustrated embodiment, has a preselected length such that the head of the set screw is recessed within the bore 38 when the set screw is advanced into the bore until its end portion 42 engages and joins with the head 14. In this connection, the cross-sectional outline of the adaptor body is not altered by the securing means.

A sleeve member 44 is provided to secure the files/rasps within their respective grooves 30. The illustrated sleeve member includes a centrally disposed bore 46 which is proportioned for receiving the adaptor body. Bores 48 extend substantially perpendicularly with respect to the axis of the centrally disposed bore 46 through the wall of the sleeve member. Each of these bores 48 open at one end portion on the external surface of the wall of the sleeve member and open at their respective further end portions on the internal surface of the walls of the sleeve members. These bores 48A-48C are spaced such that they are juxtaposed with respect to the corresponding groove in the perimeter of the adaptor body upon telescoping the sleeve over the adaptor body is illustrated in FIG. 3. More specifically, the bore 48A is aligned with the groove 30A, the bore 48B is aligned with the groove 30B and the bore 48C is aligned with the groove 30C.

Securing means 50 extends through each of the bores 48 in the sleeve member and engage the shank of a file/rasp disposed in the aligned groove of the adaptor body. In the illustrated embodiment, the securing means comprises a plurality of set screws 50A-50C which secure the shank portion of files/rasps positioned within the aligned grooves 30A-30C respectively.

Bushing means generally indicated at 54 in FIGS. 5 and 6 serve to alter the effective diameter of the centrally disposed bore 26 of the adaptor body such that the chuck of the present invention has a substantially universal fit, that is, it receives the head of sabre or power saws having various cross-sectional outlines. Preferably, the bushings assist in forming a snug fit between the adaptor body and the head. In this connection, the bushing 54 is inserted into the centrally disposed bore 26 as illustrated in FIG. 3 to vary the effective diameter of this bore 26. The bushings illustrated in FIGS. 5 and 6 define cut-out sections 56 adapted for being aligned with the securing means 40 which extend through the cut-out section and engages the head 14 in applications employing the bushing 54.

FIG. 6 illustrates the utilization of a pair of telescoped bushings for further varying the effective diameter of the centrally disposed bore 26. More specifically, the bushings illustrated in FIG. 6 are substantially identical with the exception of their diameter, and are proportioned such that the inner bushing can be received within the opening of the external bushing for further adjusting the effective diameter of the chuck. Moreover, the cut-out sections 56 are aligned for receiving the securing means 40 therethrough.

Alternate securing means 40' is illustrated in FIG. 3. In this embodiment, the securing means 40' extends through a bore in the sleeve and the aligned bore 38 in the adaptor body. The end portion 42 of the securing means 40' is received in the cut-out section 56 of the bushing 54 and engages the head 14 for securing the chuck to the head.

From the foregoing detailed description, it will be recognized by those skilled in the art that the sabre saw and/or power saw chuck described and illustrated will incorporate certain advantages over known prior art. For example, the chuck of the present invention incorporates a universal fit feature having an adjustable effective diameter for mounting on heads of sabre saws or power saws of various diameters. The chuck serves to receive and secure one or more files/rasps to the reciprocating head of the sabre saw such that reciprocating motion is imparted to the files/rasps during operation of the saw motor. The grooves which receives the shank portion of the files/rasps may assume various geometrically outline such that the chuck can be utilized with various cross-sectional outlined shanks. Moreoever, the construction of the chuck of the present invention is inexpensive and can be readily installed on the head of a sabre saw or power saw.

While a preferred embodiment has been shown and described, it will be understood that there is no intent to limit the invention by such disclosure, rather, it is intended to cover all modifications and alternate constructions following within the spirit and scope of the invention as defined in the appended claims.

I claim:

1. A sabre saw chuck for securing a shank of one or more files/rasps to a reciprocatable standard sabre saw head which normally holds a saw blade in place such that such files/rasps are reciprocated during reciprocating operation of such head, said chuck comprising:
   an adaptor body having an upper surface and a lower surface and provided with a centrally disposed bore extending therethrough, said centrally disposed bore being disposed for receiving such sabre saw head therein, said adaptor body having a preselected cross-sectional outline and at least one groove disposed along the perimeter of said adaptor body for receiving such shank of a file/rasp, said groove being substantially parallel with said centrally disposed bore and opening on said lower surface of said adaptor body, and wherein said adaptor body defines a first radial bore opening into said centrally disposed bore;

a sleeve member having a centrally disposed opening proportioned for receiving said adaptor body, said sleeve member provided with a radial hole extending substantially perpendicularly with respect to the axis of said centrally disposed opening and designed for being juxtaposed with respect to said groove in said perimeter of said adaptor body, and wherein said sleeve member defines a further radial bore for alignment with said first radial bore in said adaptor body;

securing means extending through said radial hole in said sleeve member for releasably engaging such shank of a file/rasp disposed in said groove of said adaptor body; and a set screw passing through said first and further radial bores, when aligned, for releasably joining said adaptor body and said sleeve member with such head whereby reciprocation of such head imparts a like reciprocating motion to said chuck and said files/rasps carried thereby, said set screw having a first end portion for engagement with such head and a further end portion which is recessed within said further radial bore in said sleeve member.

2. The sabre saw chuck of claim 1 wherein said groove disposed along said periphery of said adaptor body opens to said upper surface, and further comprises a stop plate covering and attached to said upper surface, said stop plate provided with a central opening aligned with said centrally disposed bore to receive such head, and wherein said stop plate covers said upper end of said groove in said adaptor body to prevent longitudinal movement of such files/rasps with respect to said adaptor body.

3. The sabre saw chuck of claim 1 wherein said adaptor body is provided with a plurality of longitudinal grooves disposed along the periphery, each of said grooves having a different preselected cross-sectional outline to receive such shank of such files/rasps having corresponding of said preselected cross-sectional outline.

* * * * *